(12) United States Patent
Khor et al.

(10) Patent No.: US 6,880,796 B2
(45) Date of Patent: Apr. 19, 2005

(54) ANGLE ADJUSTMENT STRUCTURE FOR ELECTRONIC APPARATUS HAVING DISPLAY UNIT

(75) Inventors: Yong-Kong Khor, Penang (MY); Shih-Hsiung Weng, Taipei (TW)

(73) Assignee: Inventec Multimedia & Telecom Corporation, (TW)

( * ) Notice: Subject to any disclaimer, the term of this patent is extended or adjusted under 35 U.S.C. 154(b) by 0 days.

(21) Appl. No.: 10/664,586

(22) Filed: Sep. 16, 2003

(65) Prior Publication Data

US 2005/0056765 A1    Mar. 17, 2005

(51) Int. Cl.$^7$ .............................. F16M 1/00; F16M 3/00
(52) U.S. Cl. ................... 248/677; 248/455; 248/188.2; 248/398; 248/688; 400/682; 235/145 R; 361/680; 361/681; 361/683; 16/334; 16/342
(58) Field of Search ................................ 248/677, 688, 248/397, 354.7, 292.12, 918, 188.2, 188.9, 248/455, 457, 462, 454; 400/681, 682, 693; 16/334, 16/342; 361/680, 681, 683; 238/1 D, 145 R, 238/146

(56) References Cited

U.S. PATENT DOCUMENTS

| | | | | |
|---|---|---|---|---|
| 4,516,508 A | * | 5/1985 | Kako et al. ..................... 108/7 |
| 4,527,149 A | * | 7/1985 | Swensen ...................... 341/22 |
| 4,592,528 A | * | 6/1986 | Still ............................ 248/682 |
| 4,658,124 A | * | 4/1987 | Bertina .................... 235/145 R |
| 4,693,444 A | * | 9/1987 | Williams et al. ............. 248/653 |
| 4,734,945 A | * | 4/1988 | Wright ............................. 5/11 |
| 4,915,275 A | * | 4/1990 | Brown ........................ 224/540 |
| 4,960,256 A | * | 10/1990 | Chihara et al. ........... 248/286.1 |
| 5,109,572 A | * | 5/1992 | Park ............................ 16/334 |
| 5,111,361 A | * | 5/1992 | Kobayashi ................... 361/683 |
| 5,297,003 A | * | 3/1994 | Nomura et al. ............. 361/680 |
| 5,347,424 A | * | 9/1994 | Akahane ...................... 361/680 |
| 5,469,327 A | * | 11/1995 | Cheng ......................... 361/680 |
| 5,546,271 A | * | 8/1996 | Gut et al. .................... 361/680 |
| 5,732,928 A | * | 3/1998 | Chang ......................... 348/688 |
| 6,097,592 A | * | 8/2000 | Seo et al. .................... 361/683 |
| 6,311,941 B1 | * | 11/2001 | Feldmeyer ............... 248/188.8 |
| 6,485,209 B1 | * | 11/2002 | Oura et al. .................. 400/681 |

* cited by examiner

*Primary Examiner*—Kimberly T. Wood
(74) *Attorney, Agent, or Firm*—Peter F. Corless; Steven M. Jensen; Edwards & Angell, LLP (57) ABSTRACT

An angle adjustment structure of an electronic apparatus having a display unit is provided to position the electronic apparatus on a support plane by an inclination angle. The angle adjustment structure includes: a shaft hole mount fixed in the electronic apparatus and having a hole at a central position; a rotation axle mounted in the hole of the shaft hole mount and having a plurality of locking grooves arranged at a predetermined inclination angle; and a rotation pole having one end formed with a connection pawl, wherein the connection pawl is inserted in the rotation axle to allow the rotation pole to be rotatably mounted in the shaft hole mount. Thus, as the rotation axle is supported on the support plane by the predetermined inclination angle, the electronic apparatus positioned on the support plane is inclined to allow a viewing angle of the display unit to be adjustable.

12 Claims, 6 Drawing Sheets

ANGLE ADJUSTMENT STRUCTURE FOR ELECTRONIC APPARATUS HAVING DISPLAY UNIT

FIELD OF THE INVENTION

The present invention relates generally to an angle adjustment structure of an electronic apparatus having a display unit, and more particularly, to an angle adjustment structure such that the electronic apparatus, placed on a desktop may form an adjustable inclination angle with the desktop such that the display unit may be viewed in its optimal viewing angle.

BACKGROUND OF THE INVENTION

In this epoch of the flourishing developments of computer information technology, all kinds of electronic apparatus has been developed and put on the market. For example, the conventional desktop computer which separates the mainframe and the display unit and occupies a lot of space, has evolved to notebook computers that integrate the mainframe and the display unit into one entity by a folding mechanism. This allows the display unit contained in the upper case to close up with the mainframe contained in the lower case. Thus, the occupation space is reduced and the portability is enhanced.

Figure 1:
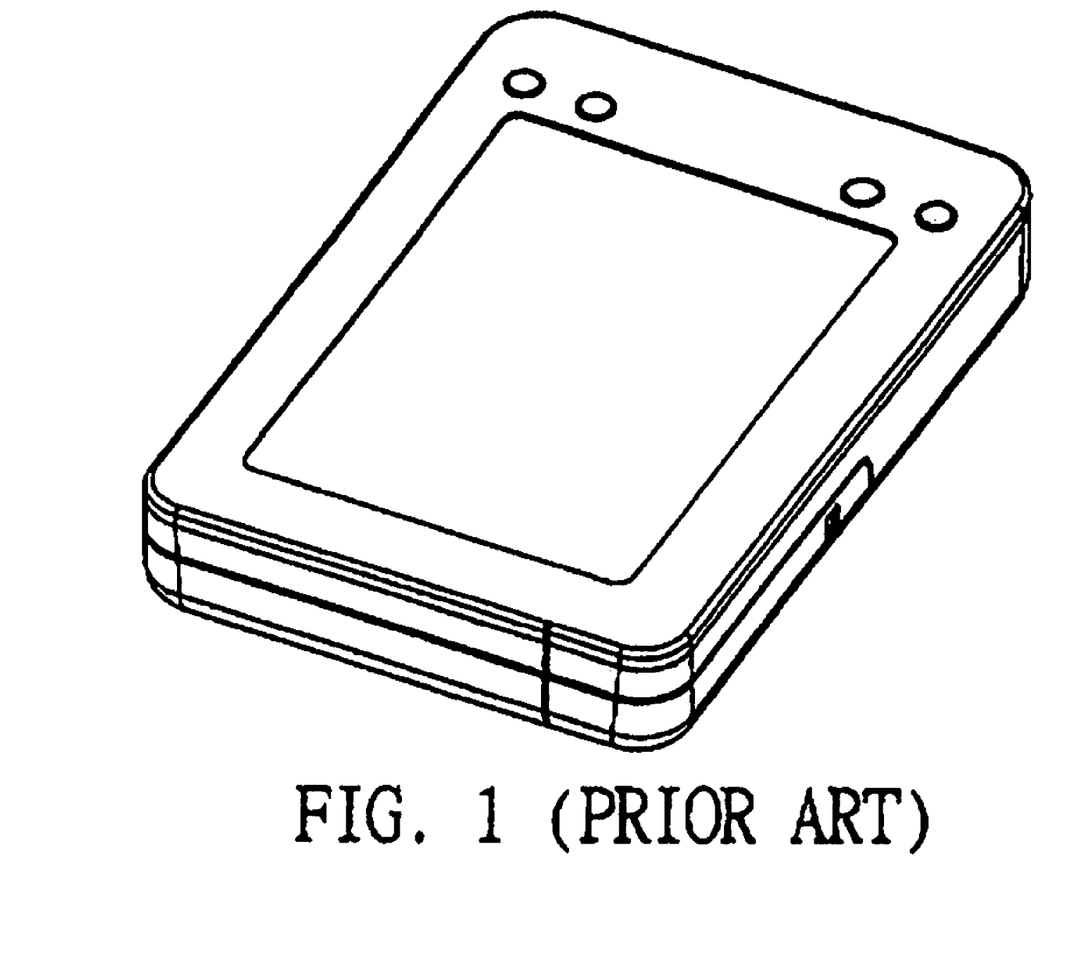
FIG. 1 (PRIOR ART) is a schematic diagram showing a conventional electronic apparatus having a display unit.

On the other hand, many other electronic apparatus with a display unit are also developed and put on the market. The design of the electronic products described above mostly focuses on its portability, convenience and the compact size. However, as shown in FIG. 1, such electronic apparatus are mostly operated by holding them in hand but not by placing them on a desktop with an optimal viewing inclination angle. Recently, a newly developed computer, generally called a Tablet PC is going on market. The appearance of such Tablet PC is quite similar to that of the personal data assistant (PDA), however, its bulk size and display unit is obviously much larger. While operating the Tablet PC, one may hold it in one hand and use an EMR pen to perform desired selections. Although, it has the advantages of convenience, portability, and usability, most of people would not afford holding a Tablet PC for a long period of time. Thus, placing a Tablet PC on a desktop to use for a longer period of time is more compliant to the human factor. However, since the appearance of a Tablet PC is mostly in a shape of a flat thin board, there is no structure for supporting the Tablet PC to make an inclination angle with the desktop on which the Tablet PC is placed. The display unit, thus, may not be viewed in the best angle. In addition, since nowadays the display unit of an electronic apparatus is mostly made of the TFT-LCD, the best viewing angle would be in perpendicular with the display unit. If the TFT-LCD is viewed in an inclined angle, the screen would become dimmer and the color would become worse.

According to the research done by the applicant, the electronic apparatus having a display unit and the latest Tablet PC, described above, no structure is provided for adjusting the inclination angle of the electronic apparatus placed on a desktop. As of today, many electronic apparatus having a display unit may only be operated by placing it on a desktop but not in an optimal viewing angle. This is in fact a generally existed defect in the structure and the function of the electronic apparatus having a display unit, it is thus necessary to improve such a defect.

SUMMARY OF THE INVENTION

One objective of the present invention is to provide an angle adjustment structure of an electronic apparatus having a display unit, such that when the electronic apparatus is put on a desktop, the display unit may be adjusted to an optimal viewing angle to increase comfort.

Another objective of the present invention is to provide an angle adjustment structure of an electronic apparatus having a display unit, such that, by viewing in perpendicular to the display unit, the best resolution and color effect may be viewed.

The angle adjustment structure of an electronic apparatus having a display unit of the present invention, wherein a shaft hole mount is configured on the inner side wall of the case shell of the electronic apparatus having a display unit. Along the hollow hole of the shaft hole mount, a rotation axle is firmly connected through the hollow hole. Inside the rotation axle, a hollow hole is configured and contains an axle center. And along the outer rim of the axle center circumference a plurality of axle ribs is configured extending to the inner wall rim of the rotation axle. The above mentioned axle ribs containing in the rotation axle divides a plurality of connection holes. The connection pawl at one end of the rotation pole is inserted through the hollow hole at one side of the case shell of the electronic apparatus and connected thereon. Rotationally connect the connection pawl together with the rotation axle into the shaft hole mount, so that the rotation pole may rotationally adjust the inclination angle of the case shell of the electronic apparatus supported on a desktop. A connection part is contained in the shaft hole mount, wherein a supporting foil is contained for producing an elastic suppression force. The curved portion at the center of the supporting foil may lock in the locking groove formed on the corresponding rotation axle. When the rotation axle adjusts angle together with the rotation pole, the curved portion of the supporting foil is locked in the rotation axle producing a proper locking force. The rotation axle may thus produce a rotation resistance and firmly affixed in one configured inclination angle.

The supporting foil contained in the connection part of the shaft hole mount is comprised of some proper elastic material. At the center of the supporting foil, a curved portion of triangular cone is formed. The curved portion of the supporting foil, corresponding, to the rotation axle, according to the inclination angle of the rotation pole, a plurality of locking groove is formed. When the rotation axle connected on one end of the rotation pole rotates to the inclination angle described above, the curved portion of the supporting foil may lock in the locking groove of the rotation axle. By the locking force generated from the curved portion and the locking groove, the rotation pole may experience a rotation resistance and firmly affixed in one inclination angle. One end of the rotation pole may support the electronic apparatus on a desktop forming an inclination angle as described above. Therefore, the display unit on the electronic apparatus may maintain a perpendicular viewing angle relative to the user.

DETAILED DESCRIPTION OF THE PREFERRED EMBODIMENTS

In order to understand further the particular features and functions of the present invention, the detailed descriptions of which in accompany with the appended drawings are given in the following.

Figure 2:
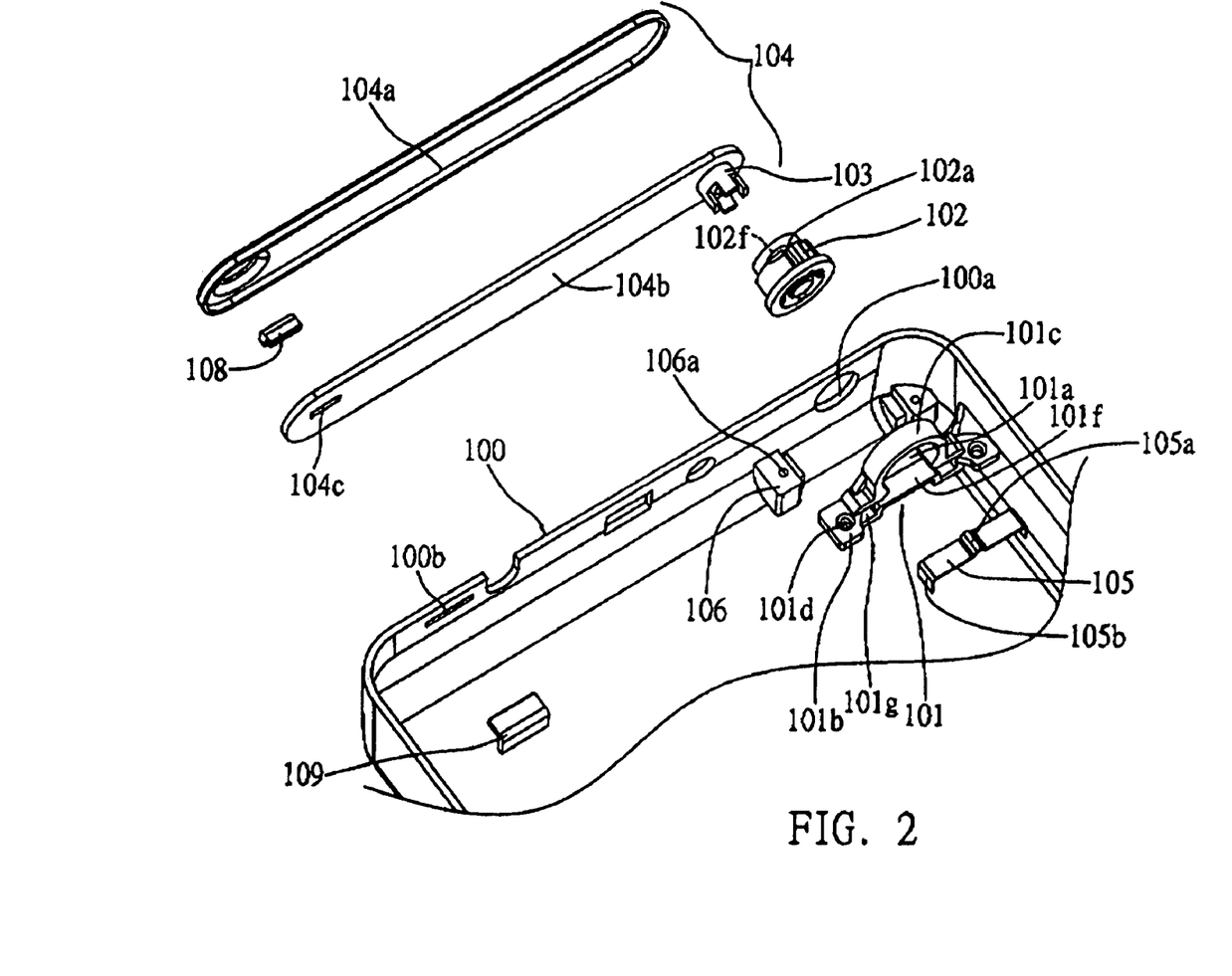
FIG. 2 is a structurally dissected view of an angle adjustment structure according to the present invention.
Figure 5:
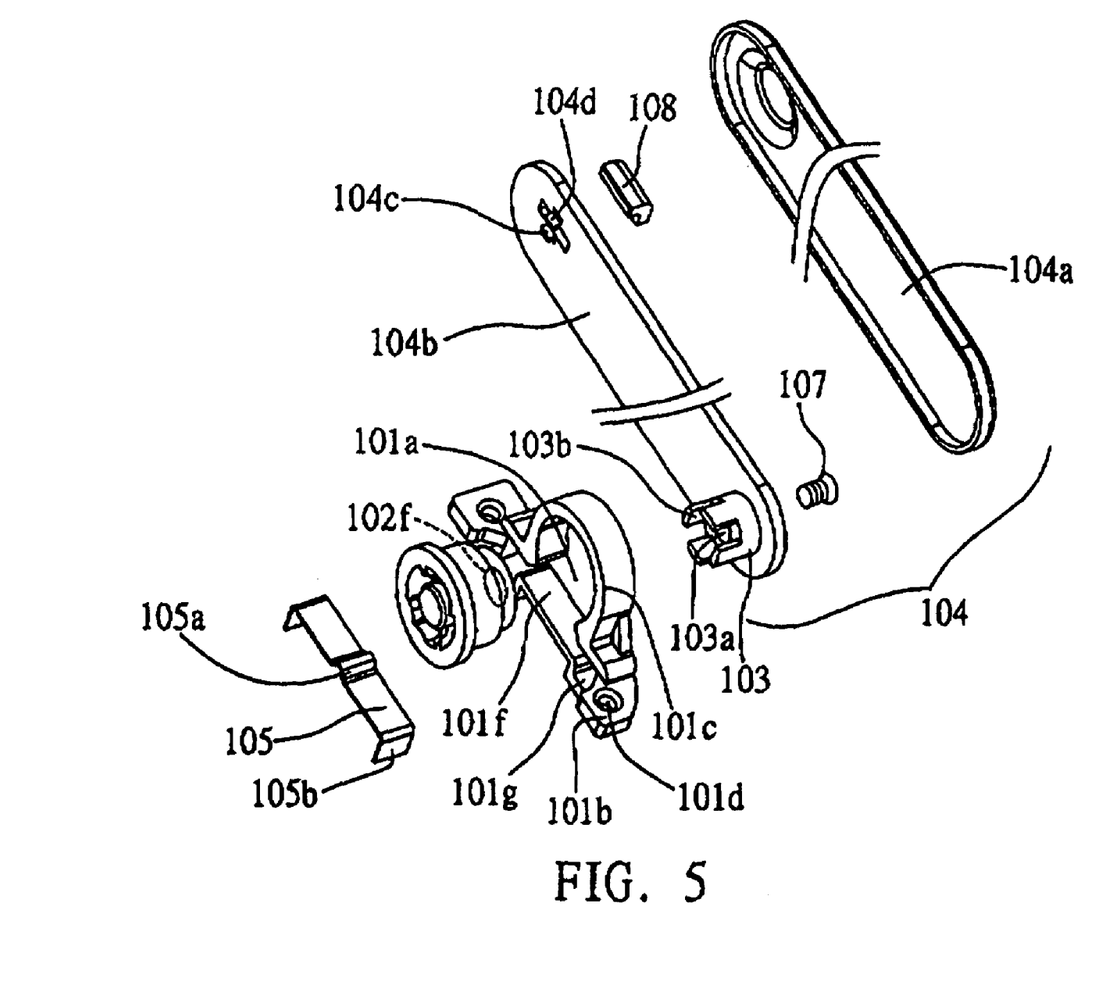
FIG. 5 is a structurally dissected view of a rotation pole of the angle adjustment structure according to the present invention.

Please refer to FIG. 2 and FIG. 5, the angle adjustment structure of an electronic apparatus having a display unit of the present invention includes: a shaft hole mount 101 configured at the inner side wall of the case shell 100 of the electronic apparatus, a shaft hole 101a formed for axle connection at the center of the shaft hole mount 101, a connection part 101b configured at the bottom of the shaft hole mount 101 for locking a connection element; a rotation axle 102 configured inside the shaft hole 101a of the shaft hole mount 101 described above, a plurality of locking grooves 102a configured at the circumference outside rim of the rotation axle 102 according to the selected inclination angle; a connection pawl 103 formed at one end of a rotation pole 104 the rotation pole 104 connected with the rotation axle 102 via the connection pawl 103, the rotation pole 104 rotational connected in the shaft hole mount 101; and a supporting foil 105 configured in the connection part of the shaft hole mount, a triangular cone like curved portion 105a formed on the supporting foil 105a at a position corresponding to the position of the locking groove 102a of the rotation axle; by using the rotation pole 104 to select a desired inclination angle, the shell case 100 of the electronic apparatus positioned and supported on a desktop by the rotation pole 104 to make a best viewing angle.

Figure 3:
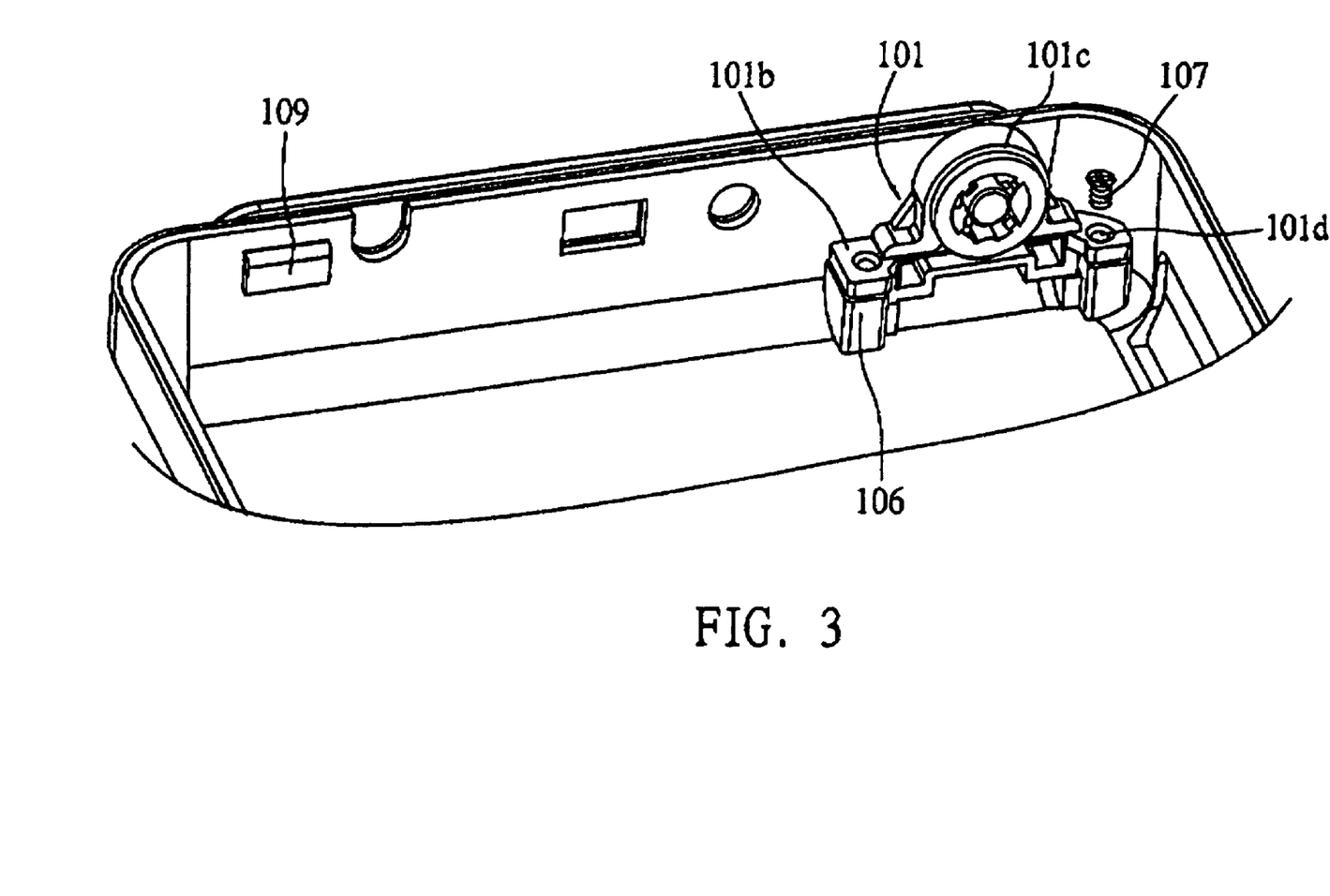
FIG. 3 is a perspective view showing a part of the angle adjustment structure according to the present invention.

The shaft hole mount 101 is formed with an arc-shaped shaft support 101c having the shaft hole 101a for axial connection. The connection part 101b is formed at the bottom of the shaft support 101c, and has a guiding hole 101d at each end thereof for allowing a connection element 107 to penetrate through the guiding holes 101d. A basis mount 106 is formed on the connection part 101b of the shaft hole mount 101 corresponding to the inner side wall of the case shell 100. A connection hole 106a is formed on the basis mount 106 perpendicularly corresponding to each guiding hole 101d of the connection port 101b, and can be coupled by the connection element 107 penetrating through the guiding holes 101d, so as to allow the shaft hole mount 101 to be firmly connected with the basis mount 106, as shown in FIG. 3. The connection element 107 can be a screw, and the connection hole 106a can be a screw hole.

Figure 4:
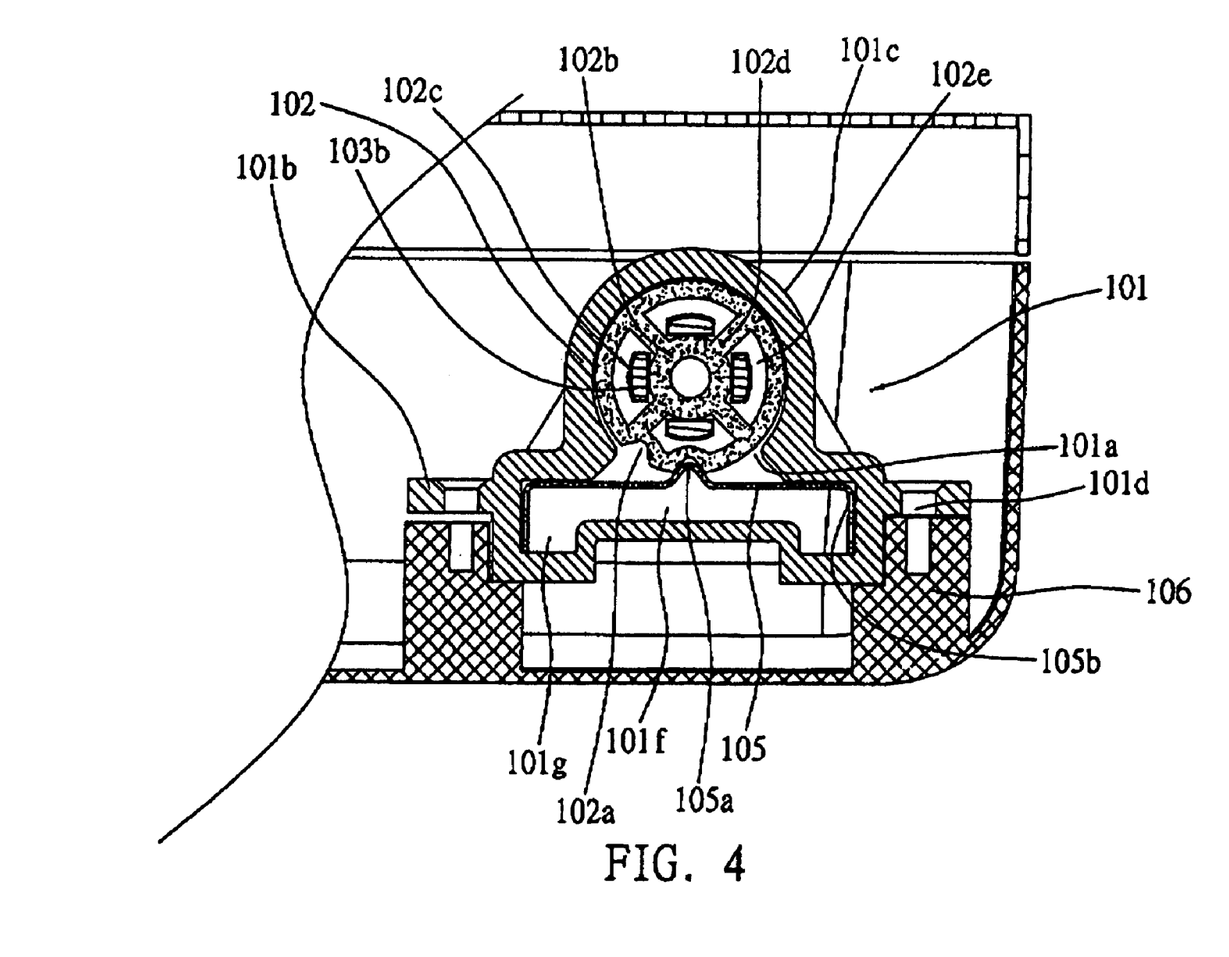
FIG. 4 is a cross-sectional view of a shaft hole mount of the angle adjustment structure according to the present invention.

A shaft hole 101a is formed at the center of the shaft support 101c of the shaft hole mount 101, as described above, to provide a rotation axle 102 rotationally configured in and integrated with the shaft hole 101a. The shaft hole mount 101 is configured in the groove hole 101f of the shaft hole 101a and the groove hole at both ends of the concave groove 101g. The groove hole 101f may contain a supporting foil 101 and the two bent portions 105b of the supporting foil 101 is embedded in the concave groove 101g. The center of the supporting foil 105 may thus, as shown in FIG. 4, be supported in the bottom rim portion of the groove hole 101f of the connection part 101b by a proper gap formed between the two ends of the bent portion 105b. The center of the supporting foil 105 forms a triangular curved portion 105a. A locking groove 102a is formed, corresponding to the curved portion 110a of the supporting foil 105, at the circumference outside rim of the rotational axle 102 contained in the shaft hole mount 101. The locking groove 102a is configured at the circumference outside rim of the rotation axle 102 according to the selected inclination angle. When the curved portion 105a of the supporting foil 105 is locked in the locking groove 102a of the rotation axle 102, the curved portion of the supporting foil 105 then produces a locking force against the locking groove 102a. Thus, the rotation axle 102 may not rotate in the shaft hole 101a of the shaft hole mount 101a by the locking force.

As shown in FIG. 2, a hollow hole 100a is formed at the rotation axle 102 contained in the shaft hole 101a of the shaft hole mount 101 corresponding to the side wall of the case shell 100 of the electronic apparatus. The hollow hole 100a may provide the connection pawl 103 formed on one end of the rotation pole 104 insert therein and connect with the rotation axle 102. Please refer to FIG. 4 at the same time, the internal part of the rotation axle 102 forms a hollow hole 102c and contains an axle center 102b therein. A plurality of axle ribs 102d is hollowly configured along the outer rim of the axle center 102b relatively extended from the outside wall of the hollow hole 102c of the rotation axle 102. This provides the connection pawl 103 at one end of the rotation pole 104 to insert into and to integrate with the connection hole 102e. As shown in FIG. 4 and FIG. 5, a through hole 103a is configured on the connection pawl 103 connected with the rotation pole 104, while a connection hole 102f not penetrated is configured on the rotation axle 103 connected on the rotation pole 104. By using the through hole 103a of the connection 103, a connection element 107 is inserted and locked on the connection hole 102f of the axle center 102b. The connection element in this preferred embodiment may be a screw and the corresponding connection hole 102f may be a screw hole. The rotation pole 104 is then connected on the rotation axle 102 along the shaft hole mount 101 capable of rotationally swinging.

The rotation axle 102 contained in the shaft hole mount 101 may configure some locking grooves 102a around the circumference outside rim of the rotation axle 102 according to the desired fix inclination angles. The locking groove 102a contained in the connection part 101b of the shaft hole mount 101 is locked by the curved portion 105a of the supporting foil 105. By the locking force due to the supporting foil 105, the rotation axle 102 is not capable of rotating. Therefore, the rotation pole 104 connected with one end of the rotation axle 102 may then maintain a fixed inclination angle supporting the case shell 100 of the electronic apparatus be positioned in that particular inclination angle. However, the supporting foil 105 described above is comprised of an elastic material, the user may apply some proper rotation force on the rotation pole 104 to adjust the rotation angle of the rotation pole 104. The supporting foil 105 is suppressed by the rotational force from the locking groove 102a of the rotation axle 102. The curved portion 105a of the supporting foil 105 thus affords the suppression force such that center portion of the supporting foil 105 is deformed downward and thus induced a displacement. Since the curved portion 105a is displaced downward, it is released from the locking position of the locking groove 102a of the rotation axle 102. The rotation pole 104 may thus rotationally adjust the inclination angle of the supported case shell 100 of the electronic apparatus. Or, as shown in FIG. 6, the rotation pole 104 may be withdrawn aid configured to one side of the case shell of the electronic apparatus such that the rotation pole 104 will not be touched while holding the case shell of the electronic apparatus by hand.

As shown in FIG. 5, the rotation pole 104, described above, is composed of a jacket board 104*a* in connection with a body board 104*b*, wherein one end of the board 104*b* is connected with connection pawl 103. A plurality of pawl portion 103*b* is formed on the connection pawl 103 each penetrating through the connection hole 102*e* of the rotation axle 102 to produce a clamping force. A groove hole 104*c* is configured relative to another end of the body board 104*b* providing the first locking piece 108 clamped between the jacket board 104*a* and the body board 104*b* to penetrate therethrough. A contribution lock 104*d* is configured along both sides of the groove hole 104*c* on the body board 104*b* to connect with the first locking piece 108 penetrated through the groove hole 104*c*. A groove hole 100*b* (shown in FIG. 2) is configured on the first locking piece 108 relative to the side wall of the case shell 100 of the electronic apparatus providing the second locking piece 109 in the case shell 100 to penetrate therethrough. The first locking piece 108 and the second locking piece 109 may be composed of a magnetic material. When the jacket board 104*a* is connected with the body board 104*b* to form the rotation pole 104, wherein the first locking piece 108 is clamped in the gap between the jacket board 104*a* and the body board 104*b*, the first locking piece 108 is penetrated through the groove hole 104*c* of the body board 104*b*. When the rotation pole 104 is rotationally affixed by the side portion of the case shell 100 of the electronic apparatus, the first locking piece 108 interconnects with the second locking piece 109 penetrated through the groove hole 100*b* at one side of the case shell 100 of the electronic apparatus by the attractive magnetic force, the first locking piece 109 and the second locking piece 109 are interconnected with each other. The rotation pole 104 may thus firmly affixed at the side wall of the case shell 100 of the electronic apparatus without loosening.

Figure 6:
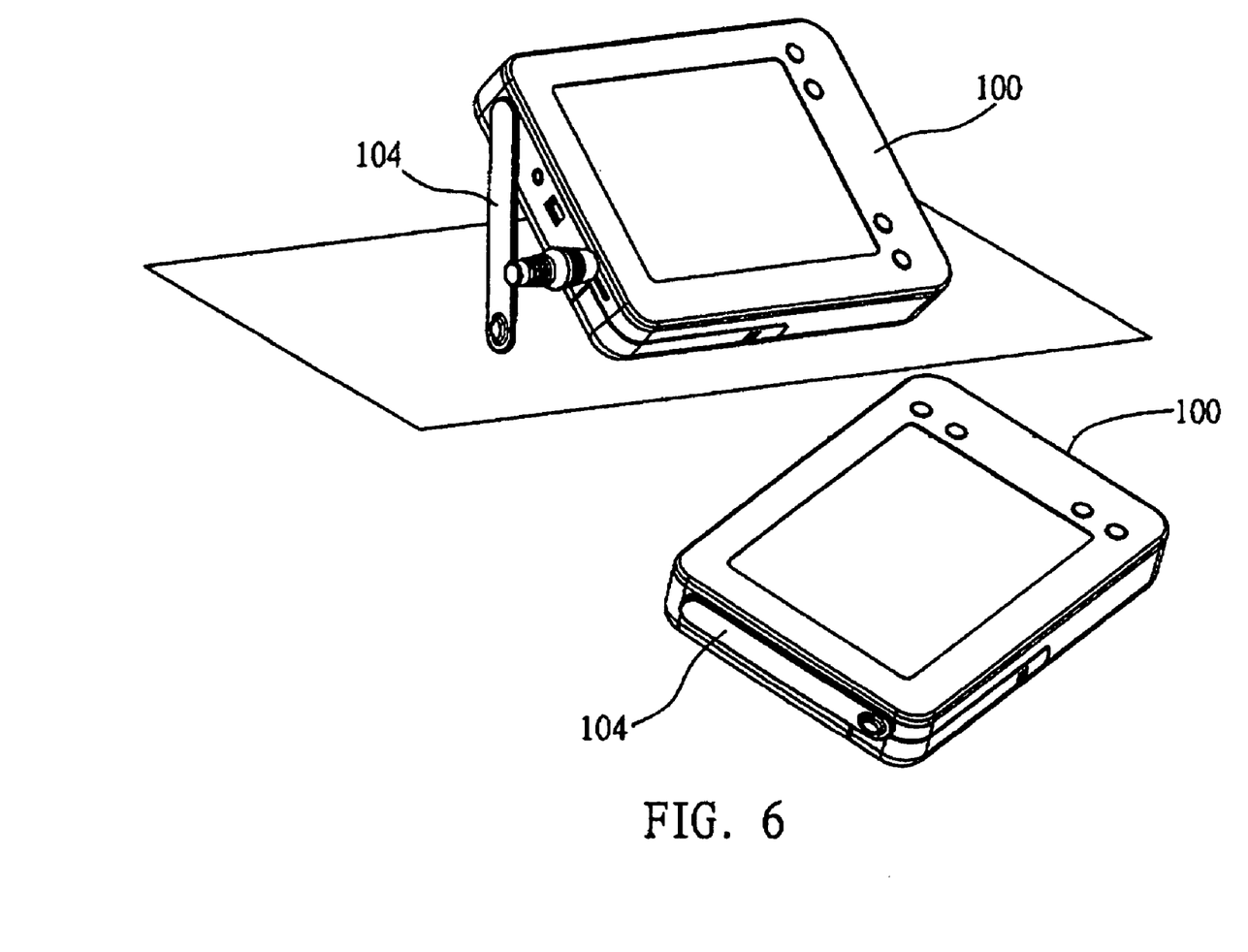
FIG. 6 is a schematic diagram showing an operational status of an electronic apparatus having the angle adjustment structure according to the present invention.

As disclosed in FIG. 6, the angle adjustment structure of an electronic apparatus having a display unit of the present invention is in its in-use state. When a user wishes to position and operate the electronic apparatus on a desktop, the rotation pole 104 may be rotated away from the side portion of the case shell 100 of the electronic apparatus and adjusted to a selected inclination angle. The curved portion 105*a* of the supporting foil 105 in the locking groove 102*a* may be locked into the locking groove 102*a* of the rotation axle 102 forming a fixed inclination angle between the rotation pole 104 and the case shell 100 of the electronic apparatus. The user may feel that the band holding rotation pole 104 stops at some certain angles. The case shell 100 of the electronic apparatus may thus be supported to form some certain inclination angle with the desktop while positioned on the desktop. Therefore, the user may view the display unit with an optimal viewing angle to obtain the best viewing quality.

The rotation pole 104 described above may rotate to an inclination angle relative the plurality of connection grooves 102*a* on the rotation axle 102. The rotation pole 104 may then be adjusted depending on the user's built or the height of the desktop so that the case shell 100 of the electronic apparatus is supported by the rotation pole 104 with the best viewing angle. When finished operating the electronic apparatus, the user may slightly apply some force on the rotation pole 104 deforming the supporting foil 105 in the shaft hole mount 101 by the force on the rotation axle 102. The curved portion 105*a* of the supporting foil 105 is then released from the locking position of the locking groove 102*a* of the rotation axle 102. The rotation pole 104 is then rotated and withdrawn to the side wall of the case shell 100 of the electronic apparatus. The first locking piece 108 on the rotation pole 104 is locked on the second locking piece 109 on the case shell 100 of the electronic apparatus by an attractive magnetic force. The rotation pole 104 is thus affixed at the side portion of the case shell 100 of the electronic apparatus without loosening. At the same time, since some charging plug or the audio signal input plug may be distributed at the side portion of the case shell 100 of the electronic apparatus, a shielding effect may be induced to prevent unwanted objects from entering into the plugs by affixing the rotation pole 104 beside the side portion of the case shell 100 of the electronic apparatus.

The present invention described above is only to illustrate a preferred embodiment but not to limit the applicable scope of the present invention. Any equivalent alternation or modification of those skilled in the art without deviating from the principle or spirit of the present invention, for example, connecting the rotation pole at the back portion of the case shell of the electronic apparatus, is considered within the scope of the present invention as defined in the following claims.

What is claimed is:

1. An angle adjustment structure for an electronic apparatus having a display unit, comprising:
    a shaft hole mount fixed in an inner side wall of a case shell of the electronic apparatus, wherein a hole is formed for axial connection in the shaft hole mount and a connection part is formed at the bottom of the shaft hole mount for a connection element to penetrate therethrough;
    a rotation axle mounted in the hole of the shaft hole mount, wherein a plurality of locking grooves are formed at a peripheral outer rim of the rotation axle and at a predetermined inclination angle;
    a rotation pole having a connection pawl formed at one end thereof, wherein the connection pawl is inserted in the rotation axle to allow the rotation pole to be rotatably mounted in the shaft hole mount; and
    a supporting foil received in the connection part of the shaft hole mount, wherein a protruding curved portion is formed on a surface of the supporting foil facing the hole of the shaft hole mount;
    wherein by coupling between the locking grooves of the rotation axle and the curved portion of the supporting foil, the rotation pole is rotatably fixed at the predetermined inclination angle on a support plane and the electronic apparatus is inclined on the support plane to allow a viewing angle of the display unit to be adjustable.

2. The angle adjustment structure of claim 1, wherein a shaft support is formed in the shaft hole mount and has the hole for axial connection, and the connection part is formed at the bottom of the shaft support and has a guiding hole, so as to allow the connection element to penetrate through the guiding hole and a corresponding connection hole on the inner side wall of the case shell of the electronic apparatus to fix the shaft hole mount to the case shell of the electronic apparatus.

3. The angle adjustment structure of claim 2, wherein a basis mount is formed on the connection part of the shaft hole mount corresponding to the inner side wall of the case shell of the electronic apparatus, and a connection hole is formed on the basis mount perpendicularly corresponding to the guiding hole of the connection part of the haft hole mount.

4. The angle adjustment structure of claim 1, wherein the supporting foil has two ends thereof each formed with a bent portion, and a groove hole is formed in the connection part of the shaft hole mount and has two ends thereof each formed with a concave groove, so as to allow the supporting foil to be received in the groove hole and the two bent portions to be engaged with the concave grooves, such that the supporting foil is supported by the bent portions above the bottom of the groove hole of the connection part by a suitable distance.

5. The angle adjustment structure of claim 1, wherein a hollow hole is formed at the rotation axle corresponding to the inner side wall of the case shell of the electronic apparatus to allow the connection pawl of the rotation pole to be inserted in the hollow hole.

6. The angle adjustment structure of claim 1, wherein the rotation axle is formed with a hollow hole and has an axle center whose outer periphery is formed with a plurality of axle ribs extending from a wall of the hollow hole, the axle ribs forming connection holes associated with the hollow hole, to allow the connection pawl of the rotation pole to be inserted in the connection holes and connected with the rotation axle.

7. The angle adjustment structure of claim 6, wherein a through hole is formed in the connection pawl of the rotation pole, and a connection hole is formed at the axle center of the rotation axle corresponding to the connection pawl.

8. The angle adjustment structure of claim 1, wherein the supporting foil is made of an elastic material, and the curved portion is formed at the center of the supporting foil and capable of deforming the supporting foil in response to an external force to allow the supporting foil to be uncoupled from the locking grooves of the rotation axle.

9. The angle adjustment structure of claim 1, wherein the rotation pole is comprised of a jacket board in connection with a body board, the body board having one end formed with a plurality of connection pawls and the other end formed with a flat groove hole for a first locking piece to penetrate therethrough.

10. The angle adjustment structure of claim 9, wherein a groove hole is formed on the inner side wall of the case shell of the electronic apparatus corresponding to the groove hole where the first locking piece penetrates at one end of the body board to allow a second locking piece to penetrate through the groove hole of the electronic apparatus.

11. The angle adjustment structure of claim 10, wherein the first locking piece and the second locking piece are made of magnetic materials.

12. The angle adjustment structure of claim 1, wherein the curved portion of the supporting foil is formed at the center of the supporting foil and has a triangular conical shape.

* * * * *